US012444886B2

(12) United States Patent
Little

(10) Patent No.: US 12,444,886 B2
(45) Date of Patent: Oct. 14, 2025

(54) CONTACT ASSEMBLY AND METHOD OF MAKING SAME AND ELECTRICAL CONNECTOR INCLUDING THE CONTACT ASSEMBLY

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Terrance F. Little, Fullerton, CA (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 379 days.

(21) Appl. No.: 18/052,277

(22) Filed: Nov. 3, 2022

(65) Prior Publication Data

US 2023/0139926 A1 May 4, 2023

Related U.S. Application Data

(60) Provisional application No. 63/267,812, filed on Feb. 10, 2022, provisional application No. 63/263,565, filed on Nov. 4, 2021.

(51) Int. Cl.
*H01R 13/6471* (2011.01)
*H01R 13/41* (2006.01)
*H01R 43/24* (2006.01)

(52) U.S. Cl.
CPC ......... *H01R 13/6471* (2013.01); *H01R 13/41* (2013.01); *H01R 43/24* (2013.01)

(58) Field of Classification Search
CPC ............ H01R 13/6471; H01R 13/6599; H01R 13/6597; H01R 13/6586; H01R 13/41
USPC .............. 439/86, 90, 607.02, 607.03, 607.05
See application file for complete search history.

(56) References Cited

U.S. PATENT DOCUMENTS

| | | | | |
|---|---|---|---|---|
| 7,581,990 B2 * | 9/2009 | Kirk | H01R 13/514 | 439/607.05 |
| 7,883,367 B1 * | 2/2011 | Kline | H01R 13/6587 | 439/607.05 |
| 8,177,564 B1 * | 5/2012 | Ito | H01R 13/6471 | 439/108 |
| 8,267,721 B2 * | 9/2012 | Minich | H01R 12/724 | 439/607.05 |
| 8,764,460 B2 * | 7/2014 | Smink | H01R 13/6597 | 439/92 |

(Continued)

FOREIGN PATENT DOCUMENTS

| | | | |
|---|---|---|---|
| CN | 204760581 U | 11/2015 | |
| CN | 105490094 A | 4/2016 | |
| CN | 105932458 B * | 7/2018 | H01R 13/02 |

*Primary Examiner* — Marcus E Harcum
(74) *Attorney, Agent, or Firm* — Ming Chieh Chang

(57) ABSTRACT

A contact assembly for an electrical connector includes: a signal contact module including an insulator and plural pairs of signal contacts insert-molded with the insulator; plural ground contacts each disposed beside a corresponding pair of signal contacts; and a conductive plastic member molded to connect the plurality of ground contacts, wherein each ground contact has a hole and the conductive plastic member enters the holes of the ground contacts.

13 Claims, 9 Drawing Sheets

(56) References Cited

U.S. PATENT DOCUMENTS

| | | | | |
|---|---|---|---|---|
| 8,864,506 | B2 * | 10/2014 | Little | H01R 13/658 439/108 |
| 8,888,531 | B2 * | 11/2014 | Jeon | H01R 13/658 439/607.07 |
| 8,899,996 | B2 * | 12/2014 | Lim | H01R 13/6585 439/607.05 |
| 9,692,183 | B2 | 6/2017 | Te | |
| 9,768,557 | B2 * | 9/2017 | Phillips | H01R 13/6585 |
| 10,367,308 | B2 | 7/2019 | Little et al. | |
| 10,396,513 | B2 | 8/2019 | Molex | |
| 10,461,475 | B2 * | 10/2019 | Little | H01R 13/6658 |
| 10,581,201 | B2 * | 3/2020 | Hsu | H01R 13/405 |
| 10,680,387 | B2 * | 6/2020 | Cheng | H01R 24/60 |
| 10,944,189 | B2 * | 3/2021 | Xu | H01R 12/75 |
| 11,646,535 | B2 * | 5/2023 | Lin | H01R 13/6597 439/607.02 |
| 11,699,880 | B2 * | 7/2023 | Song | H01R 12/585 439/607.05 |
| 11,799,246 | B2 * | 10/2023 | Johnescu | H01R 12/716 |
| 2007/0049118 | A1 * | 3/2007 | Reeser | H01R 12/716 439/607.05 |
| 2012/0077380 | A1 * | 3/2012 | Minich | H01R 13/6589 439/607.05 |
| 2013/0337667 | A1 * | 12/2013 | Szczesny | H01R 4/04 439/92 |
| 2014/0087589 | A1 * | 3/2014 | Yu | H01R 13/6594 439/607.02 |
| 2014/0127946 | A1 * | 5/2014 | Ito | H01R 13/6599 439/629 |
| 2014/0148054 | A1 * | 5/2014 | Annis | H01R 13/6588 439/607.05 |
| 2014/0342607 | A1 * | 11/2014 | Wang | H01R 13/6587 439/607.05 |
| 2016/0134057 | A1 * | 5/2016 | Buck | H01R 13/6585 439/607.05 |
| 2021/0075164 | A1 * | 3/2021 | Chen | H01R 13/2464 |
| 2021/0336360 | A1 | 10/2021 | Kolak et al. | |
| 2022/0021158 | A1 | 1/2022 | Little et al. | |
| 2022/0216635 | A1 | 7/2022 | Little et al. | |
| 2023/0144251 | A1 * | 5/2023 | Lee | H01R 13/6585 439/607.05 |
| 2023/0187881 | A1 * | 6/2023 | Lee | H01R 13/6585 439/607.05 |

* cited by examiner

CONTACT ASSEMBLY AND METHOD OF MAKING SAME AND ELECTRICAL CONNECTOR INCLUDING THE CONTACT ASSEMBLY

CROSS REFERENCE TO RELATED APPLICATIONS

This application claims priority to and benefit of U.S. Provisional Patent Application No. 63/263,565, filed Nov. 4, 2021, and U.S. Provisional Patent Application No. 63/267,812, filed Feb. 10, 2022.

BACKGROUND OF THE INVENTION

Field of the Invention

The present invention relates to a contact assembly for an electrical connector, and method of making the same, and an electrical connector including the contact assembly, the contact assembly comprising: a signal contact module including an insulator and plural pairs of signal contacts insert-molded with the insulator; a plurality of ground contacts each disposed beside a corresponding pair of signal contacts; and a conductive plastic member connecting the plurality of ground contacts.

Description of Related Arts

U.S. Pat. No. 9,768,557 discloses an electrical connector in which, during manufacture, signal and ground contacts may be stamped and formed contacts defining leadframes. The leadframes arrange the contacts in an array, and carrier strips of the leadframe may be removed after stamping and forming to define a contact array. The leadframes are overmolded to form overmold bodies. Optionally, the leadframes may be overmolded in a multi-stage molding process where main bodies are molded in a first stage and lossy ground absorbers (e.g., conductive plastic members) are molded in a second stage, or vice versa. The lossy ground absorbers may be co-molded with the main bodies in a multi-shot molding process, such as a two-shot molding process, where the main bodies and the lossy ground absorbers are molded from different materials, such as a low loss plastic material and a lossy material, respectively.

U.S. Patent Application Publication No. 2021/0336360 discloses methods and structures that combine metal ground conductors/terminals and plastic conductive ground shields, e.g., by stitchably mating one or more insert molded metal ground conductors with a respective ground conductive section that is part of a ground shield element.

SUMMARY OF THE INVENTION

A contact assembly for an electrical connector, comprising: a signal contact module including an insulator and plural pairs of signal contacts insert-molded with the insulator; a plurality of ground contacts each disposed beside a corresponding pair of signal contacts; and a conductive plastic member molded to connect the plurality of ground contacts; wherein each ground contact has a hole and the conductive plastic member enters the holes of the ground contacts.

A method of making a contact assembly comprising the steps of: molding an insulator with plural pairs of signal contacts to form a signal contact module; disposing each of a plurality of ground contacts beside a corresponding pair of signal contacts; and molding a conductive plastic member to connect the plurality of ground contacts through a hole in each ground contact for the conductive plastic member to enter.

An electrical connector comprises an insulative housing and a contact assembly received in the insulative housing, the contact assembly including: a signal contact module including an insulator and plural pairs of signal contacts insert-molded with the insulator; a plurality of ground contacts each disposed beside a corresponding pair of signal contacts; and a connecting member molded to connect the plurality of ground contacts; wherein each ground contact has a hole and the connecting member enters the holes of the ground contacts.

DETAILED DESCRIPTION OF THE DRAWINGS

Figure 1:
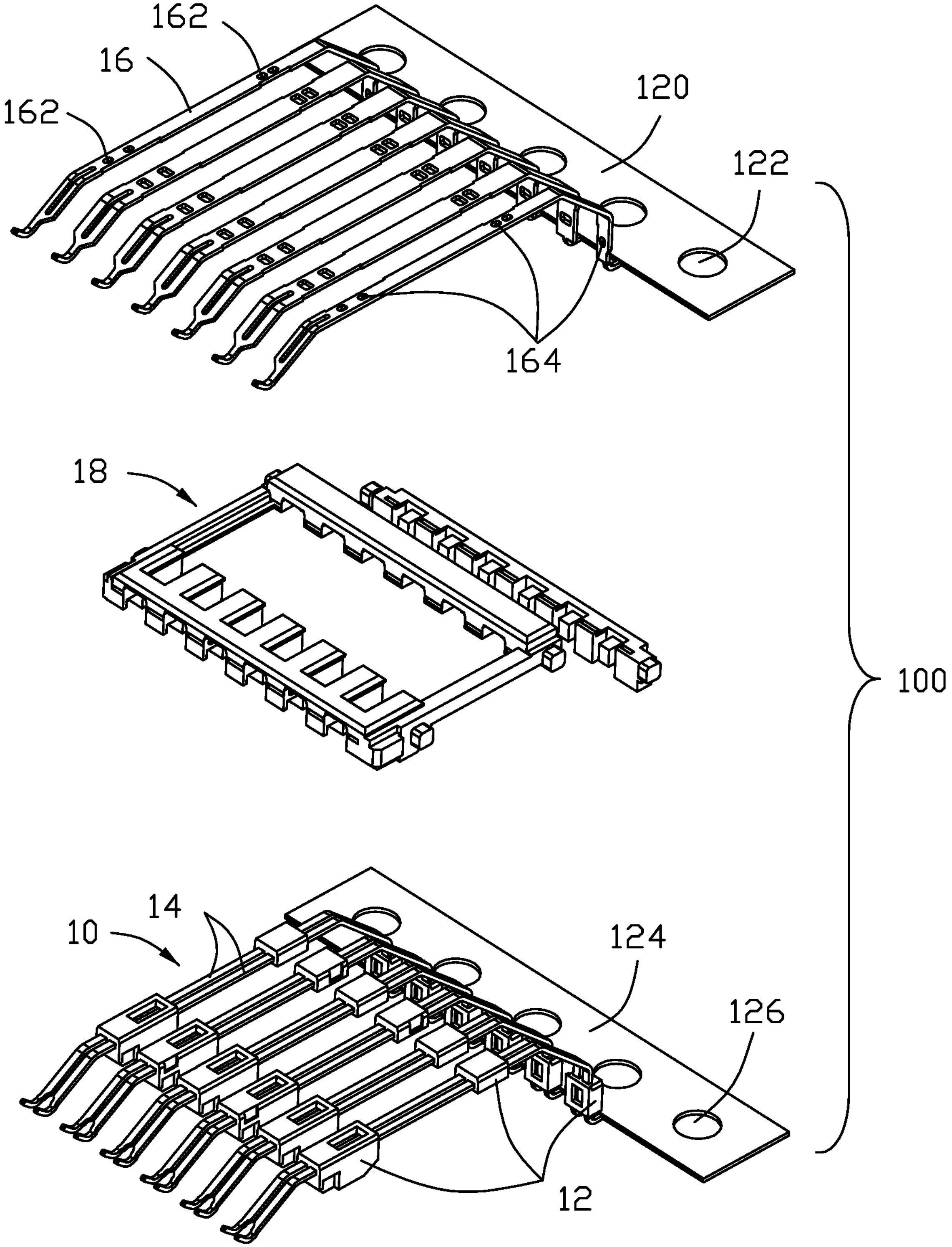
FIG. 1 is an exploded view of a contact assembly in accordance with the present invention connected with carrier strips.
Figure 2:
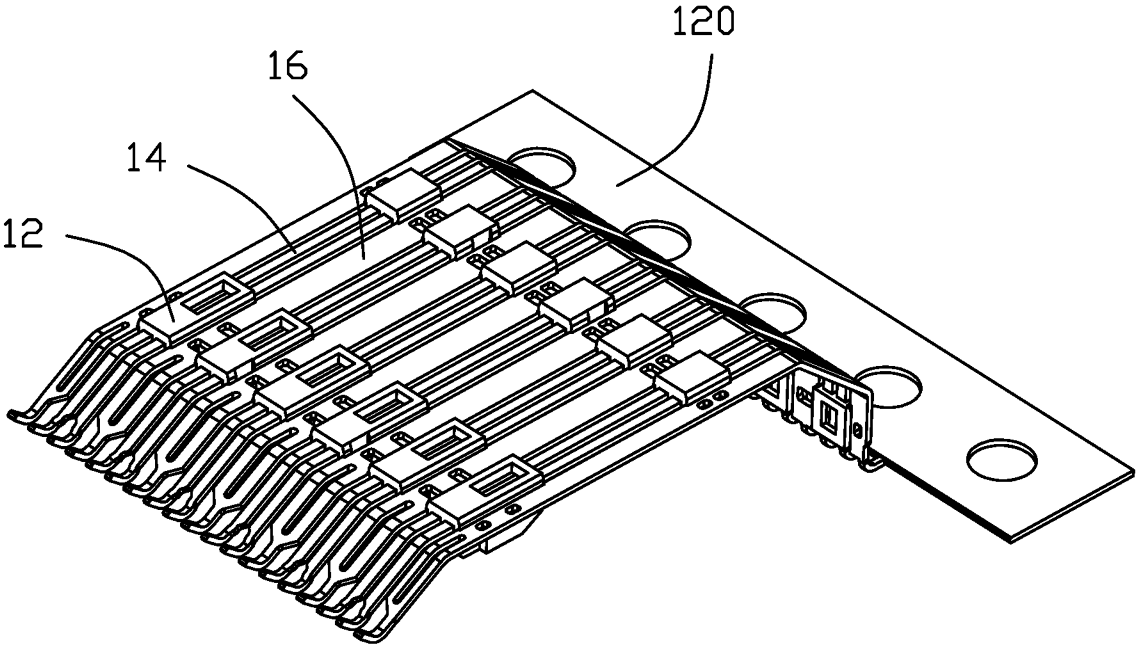
FIG. 2 is an assembled view of a part of the contact assembly.
Figure 3:
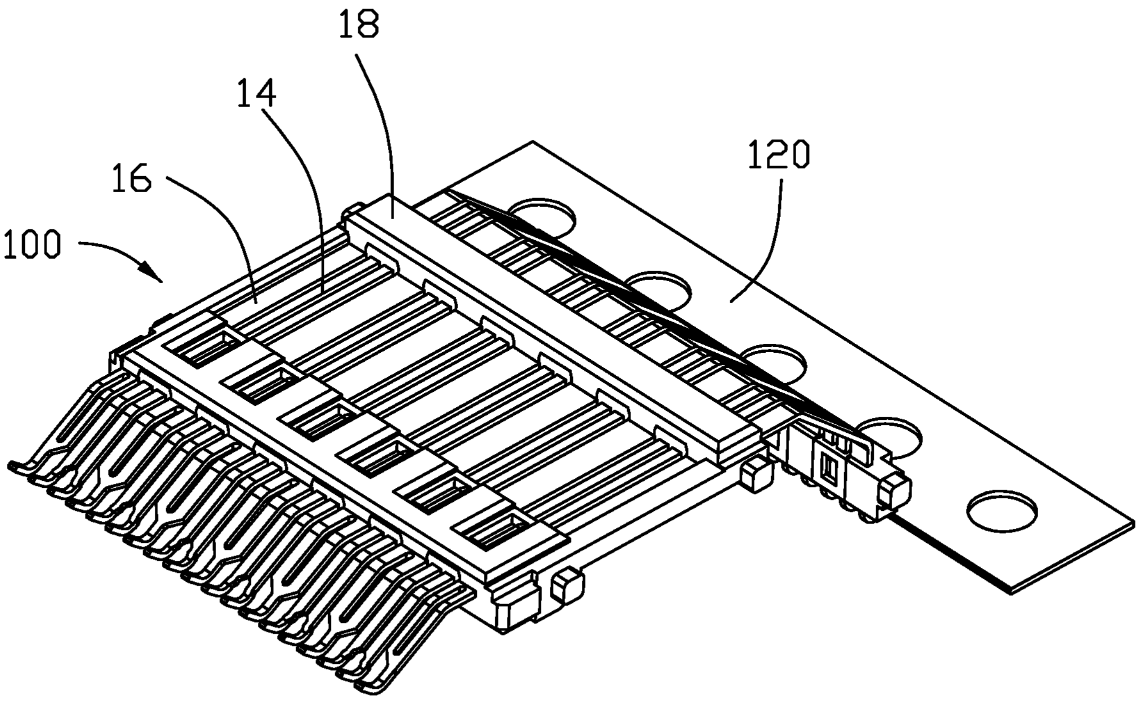
FIG. 3 is an assembled view of the whole contact assembly.
Figure 4:
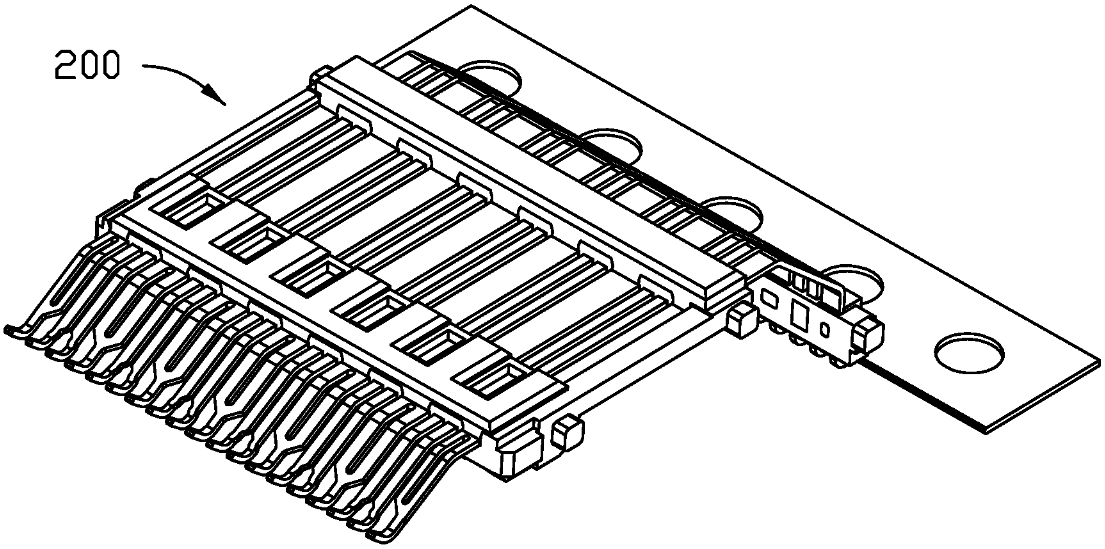
FIG. 4 is an assembled view of a varied contact assembly in accordance with the present invention connected with carrier strips.
Figure 5:
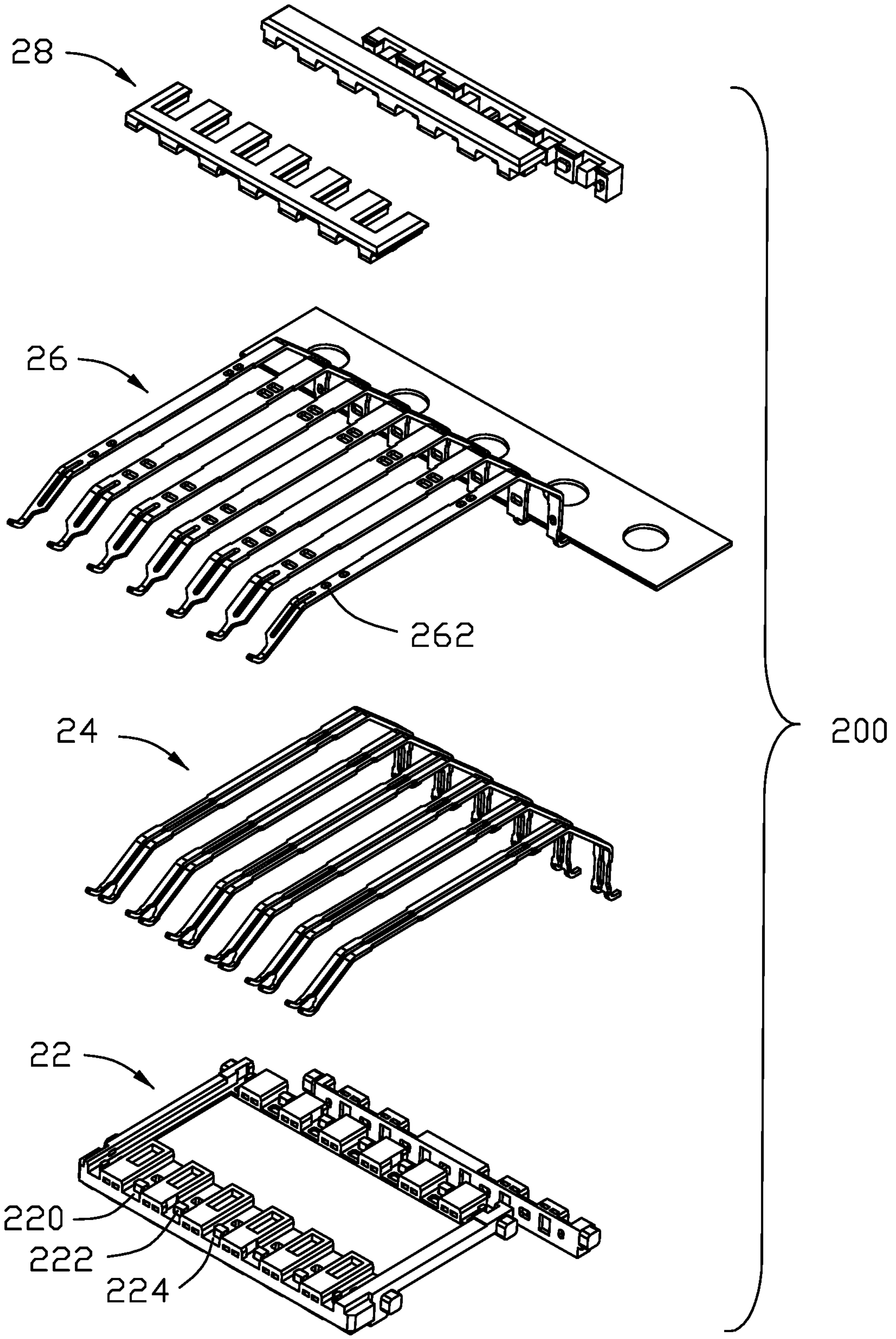
FIG. 5 is an exploded view of the contact assembly in FIG. 4.
Figure 6:
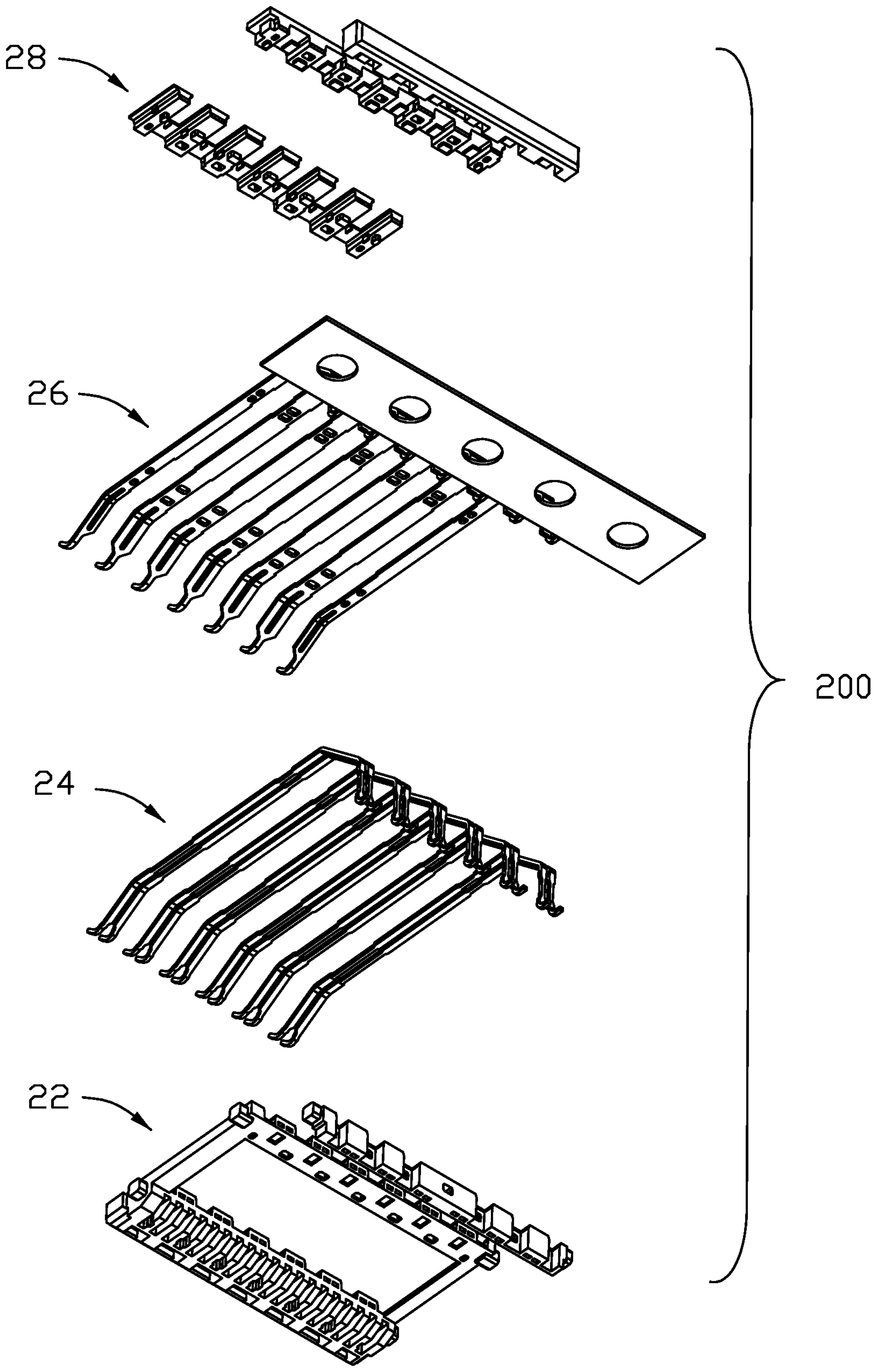
FIG. 6 is a view similar to FIG. 5 but from another perspective.
Figure 7:
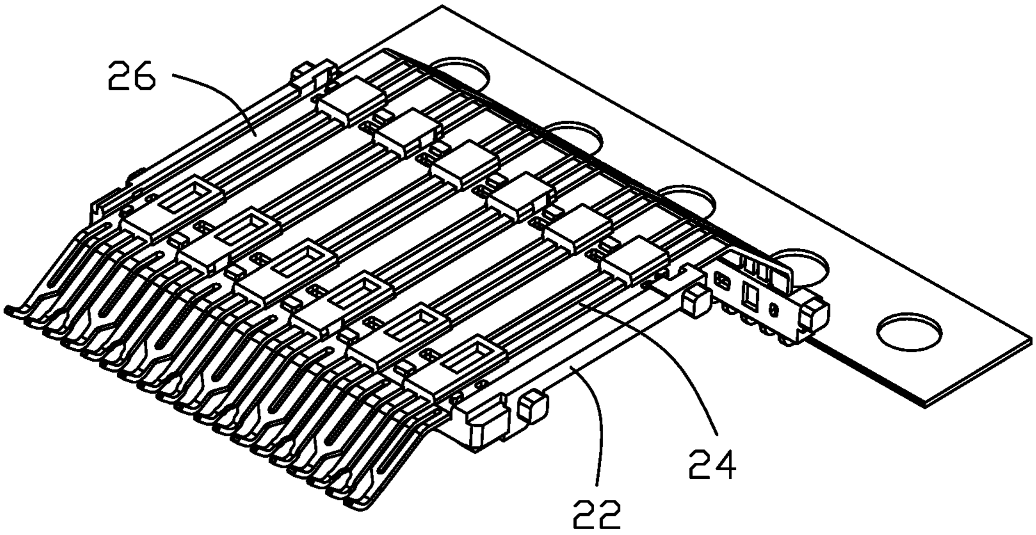
FIG. 7 is an assembled view of a part of the contact assembly in FIG. 4.
Figure 8:
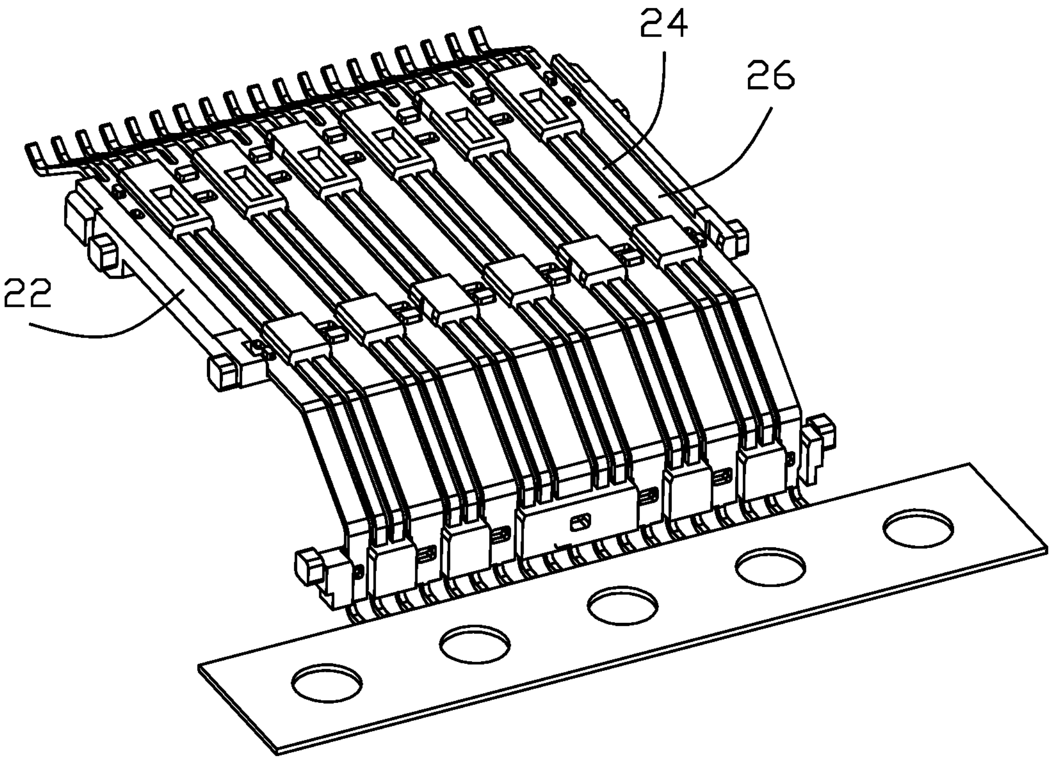
FIG. 8 is a view similar to FIG. 7 but from another perspective.
Figure 9:
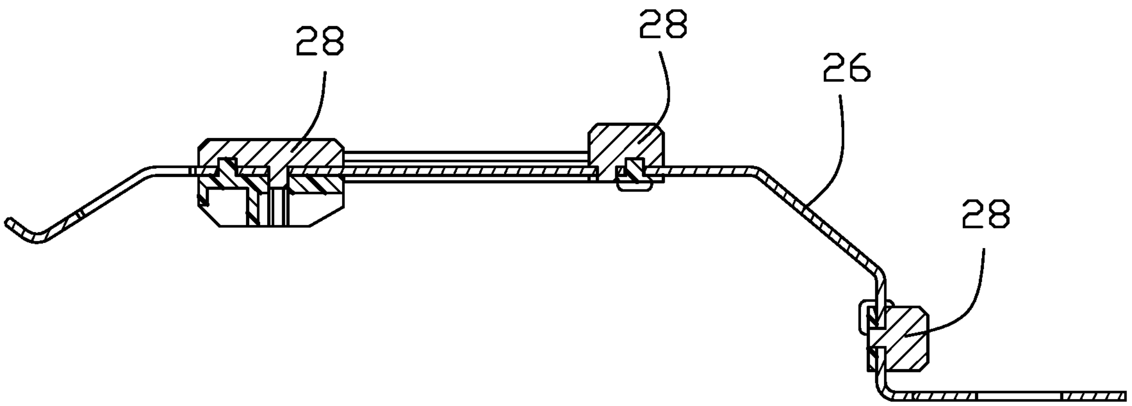
FIG. 9 is a side cross-sectional view of the contact assembly in FIG. 4.

Referring to FIGS. 1-3, a contact assembly 100 for an electrical connector comprises: a signal contact module 10 including an insulator 12 and plural pairs of signal contacts 14 insert-molded with the insulator 12, the plural pairs of signal contacts 14 being arranged in the lateral direction; a plurality of ground contacts 16 each disposed beside a corresponding pair of signal contacts 14; and a conductive plastic member 18 molded to connect the plurality of ground contacts 16 in order to mechanically and electrically connect the ground contacts 16 together but not electrically connecting the signal contacts 14. In a varied design, the conductive plastic member 18 may be replaced by or combined with liquid metal ink or conductive ink that flows and then is cured in place. Each of the ground contacts 16 and the signal contacts 14 includes a front deflectable contact portion, a rear tail portion opposite the contact portion, and a connection portion therebetween. The connecting portion includes a horizontal portion connected to the contact portion, a vertical portion connected to the tail portion, and an inclined portion located therebetween. The electrical connector may be an electrical receptacle mounted onto a host board and include an insulative housing receiving one or more such contact assemblies, such as a receptacle connector disclosed in U.S. Pat. No. 10,367,308, or it may suitably be a plug connector or a receptacle connector connected to a cable.

The signal contact module 10 shows a signal contact lead-frame with discrete molded insulating features and is molded in a first shot molding process. The insulator 12 of the signal contact module 10 includes plural discrete portions each receiving a corresponding pair of signal contacts 14. Specifically, in this embodiment, three discrete portions are formed on each pair of the signal contacts and are arranged along the length of the signal contacts, with two discrete portions being formed in the horizontal portion in the front-rear direction and one discrete portion being formed in the vertical portion. The ground contact lead-frame is stamped and formed to have positioning holes 162 for locating purpose during a second shot molding of conductive plastic and flow-thru holes 164 for conductive plastic to flow through in the second shot molding process. In the present invention, the signal contacts 14 and the ground contacts 16 are respectively formed by stamping different metal sheets. Before molding, the signal contacts 14 are connected to a carrier strip 124 and the ground contacts 16 are connected to another carrier strip 120. Before the second shot molding, both the plural pairs of signal contacts 14 and the plurality of ground contacts 16 are assembled into a mold. Pilot holes 122 and 126 on both carrier strips 120 and 124 will locate the lead-frames in the second shot mold. Second shot conductive plastic passes through the ground contact lead-frame flow-thru holes 164 and joins only the ground contacts 16 to reduce crosstalk resonance peaks and facilitate the transmission of high-speed signals. The molded conductive plastic member 18 also structurally molds to the insulator 12 for a robust completed assembly. The conductive plastic member 18 is shown as a one-piece component molded to embed a portion of each ground contact 16. It should be noted that the conductive plastic member 18 are not formed on the signal contacts 14. The conductive plastic member 18 is spaced apart from the signal contacts 14 by the insulator 12. The conductive plastic member 18 includes two laterally extending portions formed on the horizontal portion of the ground contacts 16 and one laterally extending portion formed on the vertical portion of the ground contacts 16. The two laterally extending portions of the horizontal portion are connected together on lateral sides thereof to form a whole unit.

Referring to FIGS. 4-9, a varied contact assembly 200 for an electrical connector comprises: a signal contact module 20 including an insulator 22 and plural pairs of signal contacts 24 insert-molded with the insulator 22; a plurality of ground contacts 26 each disposed beside a corresponding pair of signal contacts 24; and a conductive plastic member 28 molded to connect the plurality of ground contacts 26. The varied contact assembly 200 is different from the contact assembly 100 primarily in having a one-piece insulator 22 and a conductive plastic member 28 with plural discrete portions at different parts of the ground contacts 26. Each discrete portions extends in a lateral direction. Each discrete portion of the conductive plastic member 28 mechanically and electrically connects the plurality of ground contacts 26. In this embodiment, the horizontal portion is provided with two discrete portions, and the vertical portion is provided with one discrete portion. The insulators 22 provided in the horizontal portion are connected together on the sides in the lateral direction to form a whole unit. The one-piece insulator 22 has respective channels 220 on both sides of each pair of signal contacts 24. One or more of the channels 220 may have one or more positioning posts 222 for locating corresponding positioning hole 262 of the ground lead-frame. Chamfers 224 may be provided on the insulator 22 near the channel entrance for ease of insertion of the ground contacts 26 in a top-to-bottom direction. After the ground contacts 26 are inserted into the channels 220, conductive plastic member 28 may be conveniently molded in place in a suitable manner. The conductive plastic member 28 may enter an associated flow-thru hole of each ground contact 26 for adhesion on two or more sides of the ground contact 26.

The invention claimed is:

1. A contact assembly for an electrical connector, comprising:

a signal contact module including an insulator and plural pairs of signal contacts insert-molded with the insulator;

a plurality of ground contacts each disposed beside a corresponding pair of signal contacts; and a conductive plastic member molded to connect the plurality of ground contacts; wherein each ground contact has a hole and the conductive plastic member enters the holes of the ground contacts; and the conductive plastic member is molded to embed a respective portion of each ground contact on all sides through an associated hole.

2. The contact assembly as claimed in claim 1, wherein the insulator of the signal contact module includes plural discrete portions each receiving a corresponding pair of signal contacts, and the conductive plastic member structurally combines the signal contact module and the plurality of ground contacts together as an integral unit.

3. The contact assembly as claimed in claim 2, wherein each of the ground contacts and the signal contacts includes a deflectable contact portion at the front, a tail portion opposite the contact portion, and a connection portion therebetween, and the connecting portion includes a horizontal portion connected to the contact portion, a vertical portion connected to the tail portion, and an inclined portion located therebetween.

4. The contact assembly as claimed in claim 3, wherein the insulator of the signal contact module includes three discrete portions along the length of each pair of signal contacts, two of the three discrete portions are integrally formed in the horizontal portion, and the other discrete portion is integrally formed in the vertical portion.

5. The contact assembly as claimed in claim 4, wherein the conductive plastic member includes two laterally extending portions formed on the horizontal portions of the ground contacts and one laterally extending portion formed on the vertical portions of the ground contacts.

6. The contact assembly as claimed in claim 5, wherein the two laterally extending portions of the horizontal portion of the conductive plastic member are connected together on lateral sides thereof.

7. The contact assembly as claimed in claim 3, wherein the conductive plastic member is spaced apart from the signal contacts by the insulator.

8. The contact assembly as claimed in claim 1, wherein the insulator of the signal contact module is one-piece and has a plurality of grooves each receiving a corresponding pair of signal contacts.

9. The contact assembly as claimed in claim 8, wherein the insulator of the signal contact module has respective channels on both sides of each pair of the signal contacts to accommodate corresponding ground contacts.

10. The contact assembly as claimed in claim 9, wherein a chamfer is provided on the insulator near the channel entrance for ease of insertion of the ground contacts in a top-to-bottom direction.

11. The contact assembly as claimed in claim 9, wherein each of the channels is provided with one or more positioning posts for locating corresponding positioning holes of the ground lead-frame.

12. A contact assembly for an electrical connector, comprising:

a signal contact module including an insulator and plural pairs of signal contacts insert-molded with the insulator;

a plurality of ground contacts each disposed beside a corresponding pair of signal contacts; and a conductive plastic member molded to connect the plurality of ground contacts; wherein each ground contact has a hole and the conductive plastic member enters the holes of the ground contacts; and the insulator of the signal contact module includes plural discrete portions each receiving a corresponding pair of signal contacts, and the conductive plastic member structurally combines the signal contact module and the plurality of ground contacts together as an integral unit.

13. A contact assembly for an electrical connector, comprising:

a signal contact module including an insulator and plural pairs of signal contacts insert-molded with the insulator;

a plurality of ground contacts each disposed beside a corresponding pair of signal contacts; and a conductive plastic member molded to connect the plurality of ground contacts; wherein each ground contact has a hole and the conductive plastic member enters the holes of the ground contacts;

the insulator of the signal contact module is one-piece and has a plurality of grooves each receiving a corresponding pair of signal contacts;

the insulator of the signal contact module has respective channels on both sides of each pair of the signal contacts to accommodate corresponding ground contacts; and a chamfer is provided on the insulator near the channel entrance for ease of insertion of the ground contacts in a top-to-bottom direction.

* * * * *